April 17, 1962 J. C. ALBRECHT 3,030,609

DATA STORAGE AND RETRIEVAL

Filed Oct. 11, 1957

3 Sheets-Sheet 1

INVENTOR
J. C. ALBRECHT
BY Kenneth B. Hamlin
ATTORNEY

April 17, 1962 J. C. ALBRECHT 3,030,609

DATA STORAGE AND RETRIEVAL

Filed Oct. 11, 1957

3 Sheets-Sheet 2

INVENTOR
J. C. ALBRECHT
BY Kenneth B. Hamlin
ATTORNEY

April 17, 1962 J. C. ALBRECHT 3,030,609

DATA STORAGE AND RETRIEVAL

Filed Oct. 11, 1957 3 Sheets-Sheet 3

FIG. 3

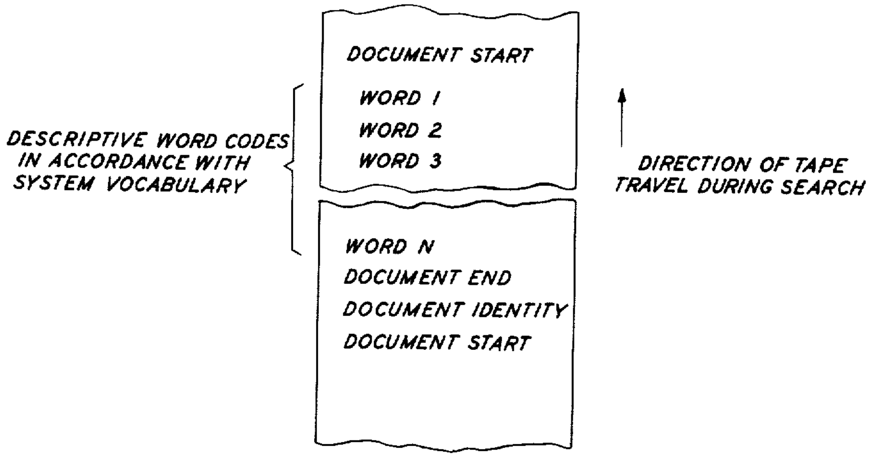

FIG. 4

REQUEST FOR MACHINE SEARCH

| WORD | IDENTIFIER WORDS | IDENTIFIER CODE | ESSENTIAL |
|---|---|---|---|
| 1 | TRANSISTOR | 1011 | NO |
| 2 | OSCILLATOR | 2369μ | YES |
| 3 | MODULATED | 4047 | NO |
| 4 | RADIO FREQUENCY | 6897 | NO |
| 5 | CRYSTAL CONTROLLED | 1645 | NO |
| 6 | | | |

| REQUESTED BY | WHEN REQUIRED | CHARGE TO | NUMBER OF GENERAL IDENTIFIERS REQ. TO MATCH |
|---|---|---|---|
| JCA | 5-15-57 | 18373 | 3 |

INVENTOR
J. C. ALBRECHT
BY Kenneth B Hamlin
ATTORNEY 3,030,609
Patented Apr. 17, 1962

3,030,609

DATA STORAGE AND RETRIEVAL

John C. Albrecht, Chatham, N.J., assignor to Bell Telephone Laboratories, Incorporated, New York, N.Y., a corporation of New York Filed Oct. 11, 1957, Ser. No. 689,702
17 Claims. (Cl. 340—172.5)

This invention relates in general to data processing and, more particularly, to the orderly storage and retrieval of data.

Mankind in general and industry in particular have been and presently are accumulating knowledge at a prodigious rate and with each passing day the storage and retrieval of this knowledge becomes more complex. A problem in data retrieval of extreme interest is the searching of library, research or patent files to determine the identity of avialable material relating to chosen subject-matter. This problem has long plagued man and through the years many solutions have been suggested and applied. These solutions have ranged from the slow and tedious printed index systems of a library to the modern day systems employing punched cards, magnetic tape or microfilm records.

The manually searched printed index systems are obviously bulky, slow and tedious, and each of the present day prior art systems has similar serious shortcomings. For example, punched card machines require the repeated slow speed handling and scanning of cards to solve a search problem. Further, there are limitations as to the scope and number of document identifiers which may be placed on a card.

General purpose computers may be arranged to search magnetic tape index files; however, the organization of a general purpose computer is such that the speed of search would generally be computer limited. That is, in such machines, blocks of indexing information from a magnetic tape index file are placed in machine storage for processing and the file index tape must be stopped from time to time to allow the machine to complete its search of the stored information block.

Microfilms, being permanent records, cannot be readily changed to bring index files up to date. Further, in a microfilm system which employs a single film or a group of films for each document indexing term, the solution of a search problem is unduly complicated. Also, such a system stores an immense amount of negative information. That is, where an area on the film is reserved for each document indexed in the system, the indicia placed in the reserved location, indicating that an identifying word does not apply, is negative information and serves no useful purpose. Opposed to such a system is the arrangement employed in the present invention wherein an entry is made in the file only when a document and an identifying term are related.

It is an object of this invention accurately and rapidly to search magnetic tape index files.

It is another object of this invention to increase the efficiency of data retrieval systems.

It is a further object of this invention to make more efficient use of the storage medium in a data retrieval system.

It is another object of this invention to reduce the time required to solve a search problem.

Still another object of this invention is to reduce the complexity of data searching systems.

These and other objects of the present invention are attained in one specific illustrative embodiment by utilizing an indexing scheme wherein each indexed document is assigned a distinctive system index number or document identifying code and each identifying word or keyword which is descriptive of or relates to the subject matter of any document indexed in the system is similarly assigned a system number or keyword code. The coded information, representative of the assigned document and identifying word numbers, is stored in an orderly fashion in a serial magnetic tape index file along with system administrative codes. The administrative codes define the start and end of a group of identifying words relating to the document whose identifying code accompanies or immediately follows the end code.

In accordance with this invention, a serial search of the index tape files is performed to determine the identity of all documents relating to or defined by information entered into the search machine control input channels. The control input information comprises codes representative of words relating to or defining the subject matter of the search along with search conditions which may be imposed by the person requesting the search or by the system operator.

The conditions which may be imposed in a search conducted in accordance with this invention advantageously closely resemble the human thought processes. Accordingly, the identifying words entered in the input control channels may be designated as being of general or essential interest to the problem, the distinction being that a document in the files is definitely not of interest if one or more of the essential identifiers do not apply. However, a document may be of interest even though certain of the general identifiers do not apply. A further limitation which may be imposed is the designation of the threshold number of general identifiers which must apply for a document to be considered of interest.

An example involving a typical search problem will illustrate the system philosophy of this invention and the application of the foregoing limiting conditions.

By way of example, an engineer interested in designing a new modulated, radio frequency, crystal controlled, transistor oscillator might as a starting point request a bibliography of all available documents containing information relating to such devices. The request to the operator of the data retrieval system in accordance with the present invention would be transmitted on a standard request form. The identifying words, for example, oscillator, radio frequency, transistor, modulated, and crystal controlled, would be listed on the request form.

If the engineer desired the identity only of documents to which all of these terms applied, he would designate all of them as being essential identifiers. He might, however, wish to enlarge the scope of the search answer to include documents to which a chosen number of general identifiers apply in addition to all of the essential identifiers. For example, documents relating to radio frequency, crystal controlled oscillators, unmodulated and without transistors, or unmodulated, radio frequency transistor oscillators, without crystal control might be of interest.

Limiting conditions of this type are implemented by indicating in the system control input channels that an identifying word is of essential or general interest and that documents to which a chosen threshold number of general identifiers apply are of interest. In the example, the word "oscillator" is established as an essential identifier and the words "radio frequency, modulated, transistor and crystal controlled" are designated as being general identifiers. The person requesting the search further indicates that documents to which three of the four general identifiers apply in addition to the essential identifier would be of interest. It should be noted that in the system of this invention the order in which these identifying terms are listed is unimportant, as the machine will provide an answer regardless of the order of presentation.

Having entered a search problem into the data retrieval system, the magnetic tape index files are serially scanned and where a document meets the terms of the search request, its identity is determined and read into the output device.

A search in this system may cover the entire magnetic tape index files or may be specifically limited to a period of time. For example, the earliest dates of the transistor are known to be in the mid-1940's; therefore, a search in which a transistor is an essential identifier could be limited to the period starting with the mid-1940's to the present time.

Present day tape recording and reading techniques and data processing speeds are such that the magnetic tape files relating to a million documents may be searched in a few minutes and, in accordance with one feature of this invention, several independent search problems may be carried on simultaneously.

In accordance with another feature of this invention, the order in which identifying words descriptive of a document are presented to the invention is immaterial.

In accordance with another feature of this invention, only the identities of the documents to which specified essential identifiers apply are established as solutions to a searching problem.

In accordance with another feature of this invention, the identity of documents to which a threshold number of document identifiers apply may be established as solutions to a search problem.

In accordance with another feature of this invention, magnetic tape index files are arranged in chronological order so that a search problem may be limited to a specific period in time.

In accordance with another feature of this invention, the system searching capacity may be economically increased as the volume of search requests increases.

The above and other objects and features of this invention will be more clearly understood from the following discussion with reference to the drawing in which:

FIG. 3 is a representation of the manner in which stored information is arranged in the magnetic index tape files; and FIG. 4 is an example of a form requesting a data search.

Figure 1:
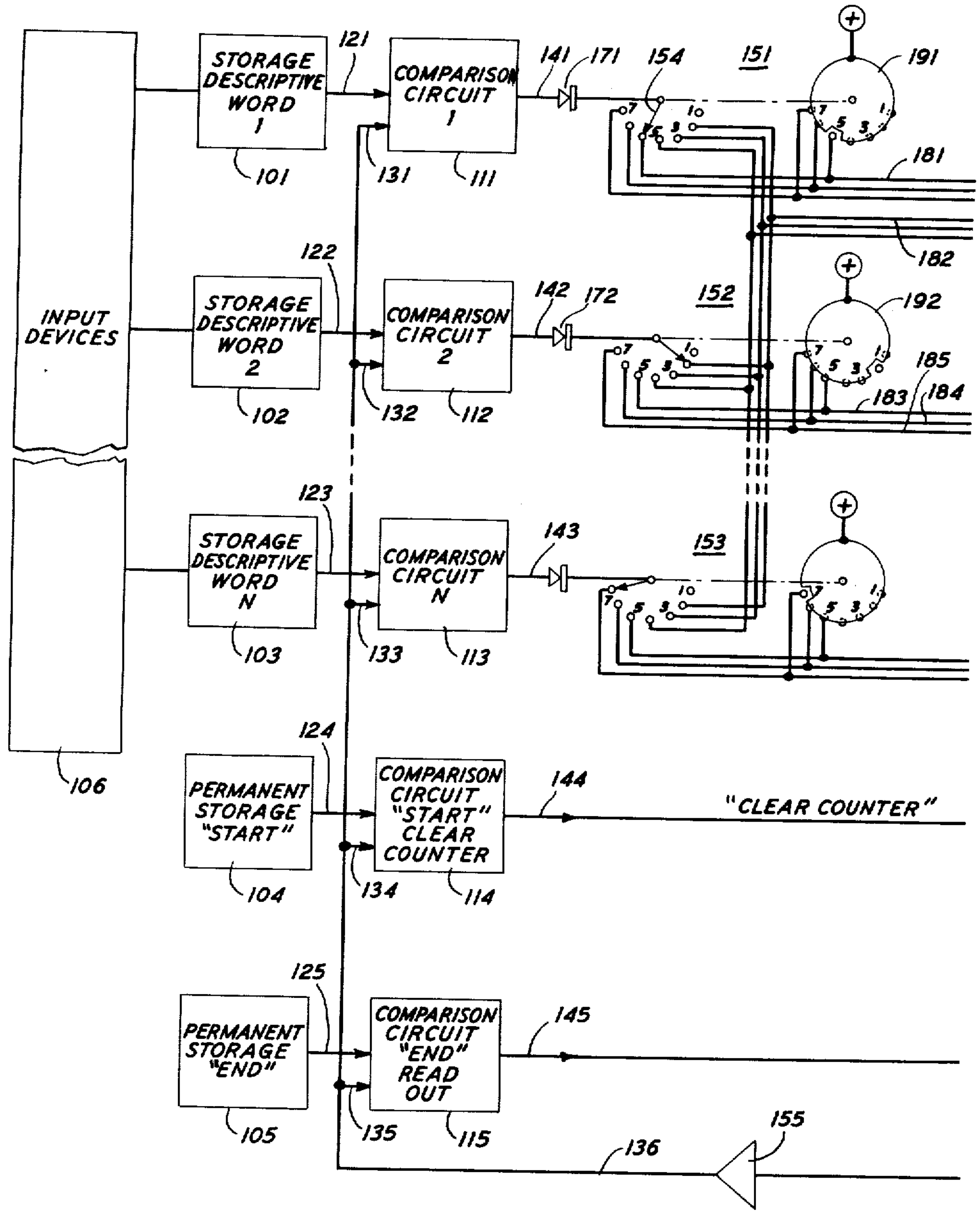
FIGS. 1 and 2 are a block diagram schematic representation of a data retrievable system in accordance with this invention.
Figure 2:
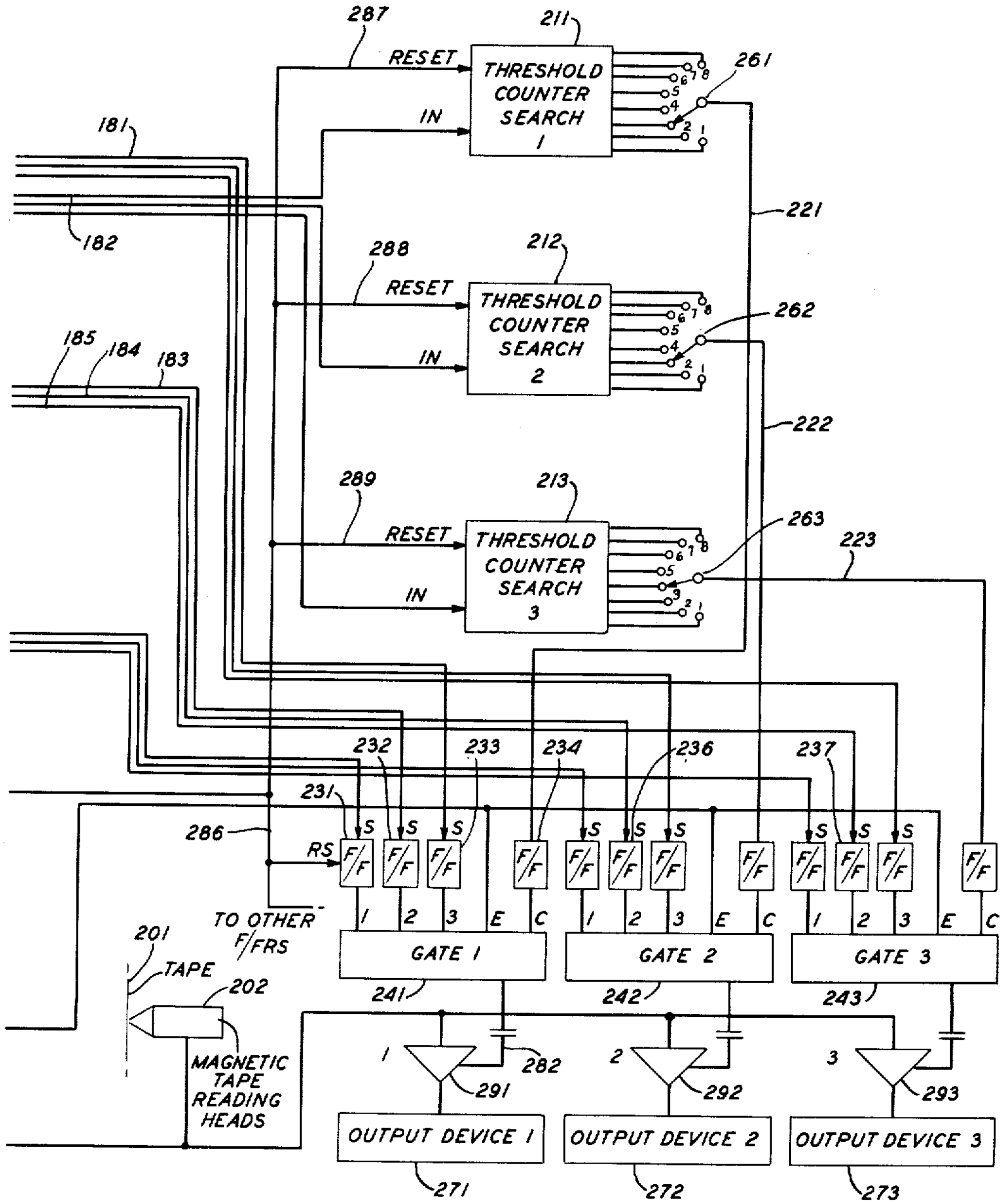

The illustrative embodiment of the present invention shown in FIGS. 1 and 2 comprises many well-known elements, shown in block diagram form, which merit a short discussion to promote an understanding of this invention. The storage blocks 101 through 105 are multicell memory devices arranged to accept input information representative of document identifiers in accordance with the code language used in the machine. At this point it should be noted that a specific code has not been designated herein, as this decision is unimportant so long as an efficient unambiguous coding system is employed. The decision as to what code would be most appropriate depends in part on the codes used by other machines used in conjunction with this system and such factors as the addition of error detection or error correction to such codes would in large depend upon the accuracy demanded of the system. Certain of the storage blocks, represented by 101 through 103, are arranged to accept input information from the input devices designated 106 in FIG. 1. Others of the storage blocks, for example 104 and 105, are permanently or semipermanently arranged to store codes representative of system administrative words which will later be described in detail.

The input devices 106 are shown in general form as these devices may range from the most simple arrangement of a plurality of keys or switches manually settable to establish the codes representative of the document identifiers or to more complex arrangements, such as operator keysets, which when manipulated are effective to generate codes representative of the document identifiers.

The comparison or match circuits 111 through 115 are well-known devices in the art and these are arranged to compare the codes on two sets of input conductors and to provide an output signal whenever the codes on the two sets are identical. For example, comparison circuit 111 has two sets of input conductors, 121 and 131, and whenever the code signals on these sets of conductors are identical, an output signal occurs on conductor 141.

Rotary switches 151, 152 and 153 each have two switch decks. In the first deck a nonbridging wiper such as 154 is settable to any one of a plurality of positions and is effective to connect the output conductor of a comparison circuit to any one of the plurality of switch terminals. The other switch deck employs a bridging wiper such as 191 which contacts all but one of the switch terminals and this uncontacted terminal is in the same switch position as the terminal to which the nonbridging wiper of the first switch deck is connected. The rotary switches 151—153 in this particular embodiment permit a document identifier to be designated as being of general or essential interest to a particular document search problem.

The amplifier 155 is a typical multichannel logic amplifier arranged to overcome the bridging loss attendant to the driving of a plurality of comparison circuits, such as 131 through 135, in parallel. The number of channels required is equal to the number of reading heads 202 utilized to read the respective channels on tape 201.

In FIG. 2 the storage tape 201, containing the system file data, is shown in a position to be read by the bank of magnetic tape reading heads 202. The output conductors of the reading heads 202 are connected in parallel to the input of logic amplifier 155 and also to the input terminals of gated logic amplifiers 291 through 293. As in the case of amplifier 155, amplifiers 291—293 each have a number of channels equal to the number of reading heads 202.

The threshold counters 211 through 213 are individually assigned to separate search problems and are arranged to count input pulses and to provide an output pulse when a threshold count has been reached. Automatic means are provided to reset the counter. The desired threshold of these counters is established by switching the counter output conductors to the desired counter output terminal. For example, when conductor 221 is set to terminal 3 it will be energized when threshold counter 211 reaches the count of 3.

The flip-flop circuits, such as 231 through 234, are typical bistable circuits which may be triggered to their two stable states by successive alternate signals on their set and reset conductors S and RS respectively.

The gates 241 through 243 are plural input AND gates which supply an output pulse to momentarily enable the associated one of the gated amplifiers 291 through 293 whenever the gate input conditions are satisfied.

In accordance with this invention, each document which is to be recorded in the system file is indexed in terms of a standard established system vocabulary and this indexing information is placed on a magnetic tape along with system administrative codes and the code representative of the assigned document identity number. The magnetic tape, arranged as shown in FIG. 3, passes a bank of magnetic reading heads 202 which read all code elements on one transverse line in parallel. Words "1" through "N," as shown in FIG. 3, are descriptive document identifiers which are part of the established system vocabulary. With reference to our earlier example, relating to the electronic design engineer, the words "transistor," "oscillator," "modulator," "radio frequency," and "crystal controlled" are examples of such vocabulary document identifiers. It should be noted that these identifiers may be arranged in any order within the tape area reserved for such words, as the order in which they are scanned is immaterial.

The previously mentioned system administrative codes employed in the illustrative embodiment of the present invention are the document Start code, shown as the first line in FIG. 3, and the document End code which immediately precede and follow, respectively, the identifiers relating to a particular document. Also, as shown in FIG. 3, the code representative of the system document identity number immediately follows the administrative End code for that particular document. The End code in turn is immediately followed by the next document Start code which indicates that the ensuing information relates to a different document. If tape width permits, the Start code of the succeeding document may advantageously accompany the identity code of the preceding document.

The administrative words and identifiers are stored on the magnetic tape in suitable code form. For example, a binary or trinary decimal digit code with or without parity check or similar error detecting means may advantageously be utilized.

To promote an understanding of my invention, the example of the electronic design engineer will be considered as a search problem presented to the search operator by means of a form such as shown in FIG. 4 and operation of the system will be described in relation to this particular problem.

The person requesting the search would be supplied with a glossary containing the system identifier vocabulary and where the simplest input devices 106 are employed, the document identifier codes representative of the identifier words would be indicated in the vocabulary and the person requesting the search includes these codes in the search request. Where more complex input devices are employed, this human translation from identifier word to identifier code number would be eliminated and a machine translation would be performed. For example, in the case of complex input devices, it would be possible, for instance by means of an alpha numeric keyset, to directly type the identifier word, such as "transistor," and a machine translation would place the identifier code number into storage.

As indicated in FIG. 4, the person requesting a search lists the document identifier search words in one column and the machine identifier code number opposite the search words in a second column. A third column is provided to indicate which words are essential to the search and which are of a general nature. In our hypothetical search problem, as indicated earlier, I have assumed interest only in documents relating to "oscillators"; therefore, "oscillator" is established as an essential word. I have also decided that the remaining words are of a general nature and this is indicated in the third column opposite the remaining identifiers. At the bottom of FIG. 4, there is a space in which a person requesting a search may indicate the number of general words which must apply in addition to the essential words for a document to be of interest. In this example four words of general interest, "transistor," "modulated," "radio frequency," and "crystal controlled" are designed as being of general interest and the person requesting a search has indicated that three of these four words must apply for a document to be of interest. For example, documents relating to "oscillators" which are in addition indexed by any combination of three out of the four general words would satisfy the terms of the request.

The illustrative embodiment of the present invention shown in FIG. 1 and FIG. 2 is advantageously arranged for searching from one to three problems in parallel. The threshold counter 211, AND gate 241, gated output amplifier 291, and output device 271 are permanently associated to perform one search problem, while their counterparts threshold counter 212, AND gate 242, gated amplifier 292, and output device 272; and threshold counter

213, AND gate 243, gated amplifier 293, and output device 273 are arranged to perform a second and third search problem in parallel with the first search problem. The identifier storage blocks 101 through 103 are permanently associated with their respective comparison circuits 111 through 113 and rotary selector switches 151 through 153. However, for purposes of flexibility, each of the units comprising a storage block and a comparison circuit may by means of its associated rotary switch be associated with any one of the three simultaneous searches. It should be noted that while arrangements for only three simultaneous searches have been provided in this example, this is not a limiting number as by the addition of additional threshold counters, gates, gating amplifiers, and output devices, along with amplifiers to overcome splitting losses, additional simultaneous searches could be readily performed.

The position of of the rotary switches 151 through 153 determines the search problem with which a storage block and comparison circuit are to be associated and also determines whether the identifier in that particular storage block is essential to the search or of general interest. In FIG. 1, each switch position 1 of switches 151 through 153 is vacant and this position is used when a storage block and a comparison circuit are idle. Switch positions 2, 3 and 4 are reserved to indicate that the identifier in the associated storage block is of general interest to search problems 1, 2 and 3, respectively, while switch positions 5, 6 and 7 indicate that the identifier in the associated storage block is essential to the search of problems 1, 2 and 3, respectively.

Storage blocks 101 through 103 are designated as blocks "1," "2" and "N" and it is to be understood that these are representative of any reasonable number of storage blocks. For example, one might allot ten storage blocks on an average to a search and, therefore, "N" would be 30 in the case illustrated in which three search problems can be undertaken simultaneously. Again, ten storage blocks per search problem is not in any way a limiting factor but is rather only by way of example. The identifier code numbers listed opposite the identifiers in FIG. 4 are entered into storage blocks "1," "2," et cetera, with one code entered per storage block. These words may be entered without regard to order of entry. The word "oscillator" being an essential word might be entered into the first storage block 101; however, a general term could equally as well be entered into this block. "Oscillator" being an essential identifier, the rotary switch 151 associated with storage block 101 and comparison circuit 111 is set to switch position 5 to indicate that this is an essential identifier and part of search problem No. 1. Placing rotary switch 151 in switch position 5 completes a path from the output terminal of comparison circuit 111 to the "set" input of flip-flop 233 via conductor 141, diode 171, wiper 154, position 5 of switch 151, and conductor 181. Therefore, an output signal from comparison circuit 111 is effective to set flip-flop 233 to its first stable state characterized as "set." It should be noted that the shorting wiper 191 of rotary switch 151 does not contact switch position 5 and therefore, does not apply to battery potential to conductor 181.

The setting of the code representative of the document identifying word "transistor," as explained below, is representative of setting into storage the codes of the remaining general identifiers. The operator sets the code for the identifier "transistor" into storage block 102 and positions rotary switch 152 to position 2 to indicate that "transistor" is a word of general interest associated with search problem No. 1. The setting of rotary switch 152 completes a path from the output terminal of comparison circuit 112 to the input terminal of threshold counter 211 via conductor 142, diode 172, switch position 2, and conductor 182; therefore, an output signal from comparison circuit 112 advances threshold counter 211 one count.

Similarly, general identifiers "modulated," "radio frequency," and "crystal controlled" are set into storage blocks intermediate to block 102 and block 103, which are not shown in FIG. 1. In each case the rotary switches associated with these additional general identifiers would be set to switch position 2 to indicate that these words are general identifiers of search problem No. 1. An output signal from a comparison circuit associated with one of these additional general identifiers would likewise advance threshold counter 211 one count.

The operator, from the lower right blank of the request form of FIG. 4, determines the number of general identifiers which must apply for a document to be of interest and then sets this information into the machine as a function of one of the switches 261 through 263. Again, this input information may be set in by positioning simple manual switches as shown or by some complex input device as a keyboard, followed by automatic machine translation, to established the threshold count at which the counter such as 211 will energize an output conductor such as 221. In this example, when threshold counter 211 has reached the count of three, an output signal will be provided on conductor 221 to set flip-flop 234.

It should be noted that when rotary switch 152 is in the idle position or in any of the general word switch positions 2 through 4, the bridging wiper 192 places positive battery potential on conductors 183, 184 and 185 to set flip-flops 232, 236 and 237. Accordingly, the gate enabling flip-flop associated with a general identifier remains set during the search.

As previously explained, gates 241, 242 and 243 are plural input AND gates which provide an output pulse to their associated gated amplifiers when enabling signals are present on all of the plurality of input conductors. For example, there is an output pulse on conductor 282 of gate 1 to enable gated amplifier 291 when all of flip-flops 231 through 234 are in their "set" state, and an output is present from comparison circuit 115 on conductor 145, thereby establishing enabling signals on terminals 1, 2, 3, E and C of gate 1.

The system of FIGS. 1 and 2 employs two administrative codes, namely Start and End, which are placed in the document search file tapes immediately preceding and succeeding the identifiers relating to a particular document, respectively. The code representative of the administrative document Start signal is permanently stored in storage block 104 and the code representative of the document End signal is permanently stored in storage block 105. The permanent storage blocks 104 and 105, for the Start and End administrative signals, are associated with comparison circuits 114 and 115, respectively.

When a Start signal is read from the magnetic tape file, the codes on input conductor groups 124 and 134 match and an output signal is produced on the "clear counter" conductor 144. This signal resets each of the threshold counters 211 through 213 and resets all of the flip-flop circuits, such as 231 through 234, associated with each of the gate circuits 241 through 243. Where a flip-flop has been placed in the set state by virtue of the setting of one of the rotary switches 151 through 153, the reset pulse provided from the output of the comparison circuit 114 is unnecessary as the flip-flops remain in their "set" state under control of their associated rotary switches. For example, rotary switch 152 when in position 2, as previously indicated, placed positive battery on the input to flip-flop 232 to hold it in its "1" state.

The magnetic tape document index files, arranged as shown in FIG. 3, are fed past the array of magnetic reading heads 202 and as the tape progresses, the document Start code, the individual identifier codes, the document End code, and the document identity codes are read. Each time a document Start code is read from the magnetic tape, the comparison circuit 114 indicates a match by providing an output signal on conductor 144 to reset all of the flip-flop circuits, such as 231 through 234, associated with a particular search problem and to reset threshold counters 211 through 213 over the reset conductors such as 287, 288 and 289, respectively.

Each identifier code on the tape file is read in parallel, and this code via logic amplifier 155 and conductor group 135 is presented to comparison circuits 111 through 115. If the code read from the tape matches the code of an identifier previously set into storage blocks 101 through 103, an output signal will occur on the comparison circuit encountering the matched condition. For example, if the code signal representative of the identifier "oscillator" is encountered, the code in storage block 101 and the code on input conductors 131 are identical and comparison circuit 111 indicates a match by means of an output pulse on conductor 141. This output signal over a previously indicated path sets flip-flop 233 to its "1" state.

At this point it should be noted that if the word "oscillator" is also placed in a storage block and associated with a second or third search as either an essential or a general identifier, further outputs to these additional search problem counters or flip-flops will be provided.

As the remaining identifier codes between word "1" and word "N" on the tape of FIG. 3 are read, these codes are successively compared with the codes in the storage blocks. If the required number of terms associated with a search problem are found between a document Start and document End code, the flip-flops, such as 231 through 233, associated with essential identifiers, and the flip-flop, such as 234, associated with a threshold counter, such as 211, will be in the "1" state. When the End administrative code is read, an enabling signal is applied over lead 145 to AND gate 241. When all of the flip-flops 231 through 235 are in their set state and a signal is present on lead 145, the AND gate 241 will be enabled and an output pulse will occur on conductor 282 to momentarily activate gated logic amplifier 291. This connects the output from the bank of magnetic reading heads 202 to the output device 271 associated with the first search problem. The document identity code which immediately follows the document End code will accordingly be read into the output device. Similarly the identity of each document meeting the terms of the search request will be determined and read into the output device.

Output devices 271 through 273, et cetera, may comprise a high-speed printer or a buffer storage unit capable of storing several document identities with provision for reading these identities out to a printer at high speed. In this example, it has been assumed that a document has been found in the storage index files which has identifiers meeting the terms of the search problem and, therefore, its identity has been read out as being of possible interest. The document identity of all other documents which do not meet the terms of the search request are not read into the output device as in each case at least one of the elements required to enable the gated amplifier 291, either outputs from essential word flip-flops or the output from the proper threshold counter, is missing and the output AND gate will not be enabled.

The arrangements described herein are merely illustrative of the principles of this invention, and it is obvious to one skilled in the art that many changes in equipment may be made without departing from the spirit and scope of the invention. For example, as previously mentioned, it is obvious that the input devices may range from the simplest push-button or rotary switching arrangement to complex key set arrangements, with translators interposed between the input device and the storage blocks such as 101, 102, and 103. Further, the functions of the rotary switches 191, 192, 261, 262, etc. may also be implemented through logic circuits activated by more complex input devices such as key sets.

It is to be understood, therefore, that the above described arrangements are merely illustrative of the application of the principles of the invention. Numerous other arrangements may be devised by those skilled in the art without departing from the spirit and scope of the invention.

What is claimed is:

1. In a data retrieval system wherein a plurality of documents, each characterized by a distinctive identifying code are indexed in accordance with subject matter keywords, each of said keywords being characterized by a distinctive keyword code, means for ascertaining the identifying codes of the particular ones of said documents indexed by predetermined ones of said keywords comprising in combination a storage medium for storing said keyword codes and said identifying codes of said plurality of documents, reading means for reading said codes stored in said storage medium, a plurality of registers, means for registering the keyword codes of each of said predetermined keywords in a different one of said registers, a plurality of comparison means individually associated with said registers for simultaneously comparing each keyword code read from said storage medium with the keyword codes registered in said associated registers, threshold means, means for connecting selected ones of said comparison means to said threshold means, said threshold means controlled by said comparison means and operative when the keyword codes recorded in said storage medium for a given document match a predetermined number of said keyword codes registered in said registers, output means and means including said reading means controlled by said threshold means when operated for entering the identifying code of said given document in said output means.

2. The combination defined in claim 1 in combination with settable means to determine said predetermined number of keyword code matches required for operation of said threshold means.

3. In a data retrieval system wherein a plurality of documents, each characterized by a distinctive identifying code, are indexed in accordance with subject matter keywords, each of said keywords being characterized by a distinctive keyword code, means for ascertaining the identifying codes of the particular ones of said documents indexed by predetermined ones of said keywords comprising in combination a storage medium for storing said keyword codes and said identifying codes of said plurality of documents, reading means for reading said codes stored in said storage medium, a plurality of registers, means for registering the keyword codes of each of said predetermined keywords in a different one of said registers, a plurality of comparison means individually associated with said registers for simultaneously comparing each keyword code read from said storage medium with the keyword codes registered in said associated registers, threshold means, means for connecting selected ones of said comparison means to said threshold means, said threshold means controlled by said comparison means and operative when the keyword codes recorded in said storage medium for a given document match a predetermined number of said keyword codes registered in said registers, output means and means including said reading means and jointly controlled by said comparison means and said threshold means for entering the identifying code of said given document in said output means.

4. In a data retrieval system wherein a plurality of documents, each characterized by a distinctive identifying code, are indexed in accordance with subject matter keywords, each of said keywords being characterized by a distinctive keyword code, means for ascertaining the identifying codes of the particular ones of said documents indexed by predetermined ones of said keywords comprising in combination a storage medium for storing said keyword codes and said identifying codes of said plurality of documents, reading means for reading said codes stored in said storage medium, a plurality of registers, means for registering the keyword codes for each of said predetermined keywords in a different one of said registers, a plurality of comparison means each associated with a different one of said registers, said comparison means controlled by said reading means to simultaneously compare each keyword code read from said storage medium with the keyword code registered in said associated one of said registers, threshold means, means for connecting selected ones of said comparison means to said threshold means, said threshold means controlled by said selected ones of said comparison means and operative when the keyword codes read from said storage medium for a given document match a predetermined number of said keyword codes registered in the ones of said registers associated with said selected ones of said comparison means, output register means and means controlled by said threshold means and certain of said comparison means for connecting said reading means to said output register means to register the identifying codes of said particular documents read from said storage medium.

5. The combination defined in claim 4 in combination with settable means to determine the particular selected ones of said comparison means to control said threshold means.

6. The combination defined in claim 5 in combination with settable means to determine said predetermined number of keyword code matches required for operation of said threshold means.

7. In a data retrieval system wherein a plurality of documents, each characterized by a distinctive identifying code, are indexed in accordance with subject matter keywords, each of said keywords being characterized by a distinctive keyword code, means for simultaneously ascertaining the identifying codes of particular ones of said documents relating respectively to a plurality of subjects, each of said subjects being defined by said predetermined ones of said keywords comprising in combination, a storage medium for storing said keyword codes and said identifying codes of said plurality of documents, reading means for reading said codes stored in said storage medium, a plurality of registers, means for registering the keyword codes of each of said predetermined ones of said keywords defining each of said subjects in a different one of said registers, a plurality of comparison means each associated with a different one of said registers, said comparison means controlled by said reading means to simultaneously compare each keyword code read from such storage medium with the keyword codes registered in said plurality of registers, a plurality of threshold means, each individually controlled by selected ones of said comparison means and each individually operative when the keyword codes read from said storage medium for a given document match a predetermined number of said keyword codes registered in the respective ones of said registers associated with said selected ones of said comparison means, a plurality of output register means, each associated with a different one of said threshold means, and means controlled by said threshold means and certain of said comparison means for selectively connecting said reading means to said pluralty of said output register means to register the identifying codes of said particular ones of said documents relating respectively to each of said plurality of subjects in a respective one of said output register means.

8. The combination defined in claim 7 in combination with settable means to individually determine the particular selected ones of said comparison means to individually control said plurality of said threshold means.

9. The combination defined in claim 8 in combination with a plurality of settable means, each associated with a different one of said threshold means to determine the number of keyword code matches required for the operation thereof.

10. In a data retrieval system wherein a plurality of documents, each characterized by a distinctive identifying code, are indexed in accordance with subject matter keywords, each of said keywords being characterized by a distinctive keyword code, means for ascertaining the identifying codes of the particular ones of said documents relating to subject matter identifiable by predetermined keywords comprising in combination, a storage medium for storing indicia repersenting the keyword codes for each document in association with an indicium representing the identifying code thereof, reading means for successively reading the keyword code indicia and the identifying code indicium stored in said storage medium for each of said plurality of documents, a plurality of registers, each settable to register distinct indicia representing a different one of said predetermined keywords, a plurality of comparison means each individually connected to a different one of said registers and controlled by said reading means to provide a match signal when a keyword code indicia read from said storage medium matches the keyword code indicia set in the register connected thereto, counting means to count said match signals from certain of said comparison means, said counting means providing an output signal when a predetermined number of match signals is counted, output means for recording the identifying codes of said particular ones of said documents, and gating means controlled by said counting means and said comparison means for selectively connecting said reading means to said output means.

11. The combination defined in claim 10 wherein said gating means comprises a plurality of two-state memory devices, means responsive to said output signal from said counting means for operating one of said two-state memory devices to the set state, means responsive to the match signals from particular ones of said comparison means for operating the others of said two-state memory devices to the set state, and means responsive to the set state of all of said two-state memory devices for connecting said reading means to said output means.

12. In a data retrieval system wherein a plurality of documents, each characterized by a distinctive identifying code, are indexed in accordance with subject matter keywords, each of said keywords being characterized by a distinctive keyword code, means for ascertaining the identifying codes of the particular ones of said documents relating to subject matter identifiable by predetermined keywords comprising in combination, a storage medium for storing indicia representing the keyword codes for each document in association with an indicium representing the identifying code thereof, the keyword indicia for each of said documents being preceded by a start code indicium and followed by a stop code indicium recorded in said medium, reading means for successively reading the start code indicium, the keyword indicia, the stop code indicium and the identifying code indicium stored in said storage medium for each of said plurality of documents, a plurality of registers each settable to register distinct indicia representing a different one of said predetermined keywords, a plurality of comparison means each individually connected to a different one of said registers and controlled by said reading means to provide a match signal when a keyword code indicia read from said storage medium matches the keyword code indicia set in the register connected thereto, counting means to count said match signals from certain of said comparison means, said counting means providing an output signal when a predetermined number of match signals is counted, output means for recording the identifying codes of said particular ones of said documents, a plurality of two-state memory devices, means responsive to said output signal from said counting means for operating one of said two-state memory devices to the set state, means responsive to the match signals from particular ones of said comparison means for operating the others of said two-state memory devices to the set state, means controlled by said reading means and operative in response to the reading of each said end code indicium in said storage medium, gating means responsive to the set state of all of said two-state memory devices and controlled by said last-named means when operated for connecting said reading means to said output means to record the identifying code of said particular ones of said documents in said output means.

13. The combination defined in claim 12 in combination with means including said reading means responsive to the reading of each said start code indicium in said storage medium for resetting said two-state memory devices to the reset state, said means also resetting said counting means to a zero count condition.

14. The combination defined in claim 13 in combination with settable means to determine said predetermined number of match signals to be counted by said counting means to obtain an output signal therefrom.

15. A data retrieval system comprising a storage medium for storing distinctive codes identifying data, reading means for reading said codes stored in said storage medium, a plurality of registers, means for individually registering particular ones of said distinctive codes in each of said registers, a plurality of comparison means individually associated with said registers for simultaneously comparing each distinctive code read from said storage medium with said distinctive codes registered in said plurality of registers, threshold means, means for connecting selected ones of said comparison means to said threshold means, said threshold means controlled by said comparison means and operative when said distinctive codes read from said storage medium for given data match a predetermined number of said distinctive codes registered in said registers, output means, and means controlled by said threshold means for enabling said output means.

16. A data retrieval system in accordance with claim 15 further comprising means directly connecting one of said comparison means to said output means whereby said output means is only enabled on detection of a match by said one comparison means.

17. A data retrieval system comprising a storage medium for storing distinctive codes identifying data, reading means for reading said codes stored in said storage medium, a plurality of registers, means for individually registering particular ones of said distinctive codes in each of said registers, a plurality of comparison means each operatively associated with a different one of said registers, said comparison means controlled by said reading means to simultaneously compare each distinctive code read from said storage medium with said distinctive code registered in said associated one of said registers, threshold means controlled by selected ones of said comparison means and operative when said distinctive codes read from said storage medium for given data match a predetermined number of said distinctive codes registered in said registers, settable means to determine the particular selected ones of said comparison means to control said threshold means, output means and means controlled by said threshold means and certain of said comparison means for enabling said output means.

References Cited in the file of this patent

UNITED STATES PATENTS

| | | |
|---|---|---|
| 2,693,593 | Crosman | Nov. 2, 1954 |
| 2,721,990 | McNaney | Oct. 25, 1955 |
| 2,737,342 | Nelson | Mar. 6, 1956 |
| 2,821,696 | Shiowitz | Jan. 28, 1958 |
| 2,885,659 | Spielberg | May 5, 1959 |